United States Patent
Lee et al.

(10) Patent No.: US 9,686,522 B2
(45) Date of Patent: Jun. 20, 2017

(54) DISPLAY APPARATUS CAPABLE OF SEAMLESSLY DISPLAYING A PLURALITY OF PROJECTION IMAGES ON SCREEN

(71) Applicant: LG ELECTRONICS INC., Seoul (KR)

(72) Inventors: Jae Kwang Lee, Seoul (KR); Seong Hong Park, Seoul (KR); Sang Keun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/912,308

(22) PCT Filed: Feb. 28, 2014

(86) PCT No.: PCT/KR2014/001670
§ 371 (c)(1),
(2) Date: Feb. 16, 2016

(87) PCT Pub. No.: WO2015/023038
PCT Pub. Date: Feb. 19, 2015

(65) Prior Publication Data
US 2016/0212396 A1    Jul. 21, 2016

(30) Foreign Application Priority Data

Aug. 16, 2013   (KR) .................. 10-2013-0097383

(51) Int. Cl.
H04N 9/31      (2006.01)

(52) U.S. Cl.
CPC ........... H04N 9/3185 (2013.01); H04N 9/312 (2013.01); H04N 9/3129 (2013.01);
(Continued)

(58) Field of Classification Search
CPC ... H04N 9/3182; H04N 9/3185; H04N 9/3194
(Continued)

(56) References Cited

U.S. PATENT DOCUMENTS 6,762,867 B2 *  7/2004  Lippert .................. G02B 26/08
                                                     359/201.1
2008/0129894 A1  6/2008  Kang et al.
(Continued)

FOREIGN PATENT DOCUMENTS

KR   10-2010-0039759 A    4/2010
KR   10-2012-0063791 A    6/2012
(Continued)

OTHER PUBLICATIONS

International Search Report dated Jun. 27, 2014 issued in Application No. PCT/KR2014/001670 (with English translation).

Primary Examiner — Michael Lee
Assistant Examiner — Jean W Desir
(74) Attorney, Agent, or Firm — Ked & Associates, LLP

(57) ABSTRACT

Disclosed herein is a display apparatus. The display apparatus includes a screen having a reflective member formed in at least a portion thereof, a first scanner configured to output a first projection image to a first area of the screen by first-direction scanning and second-direction scanning, a second scanner configured to output a second projection image to a second area of the screen by first-direction scanning and second-direction scanning, a first light detector configured to detect light received from the first area of the screen, a second light detector configured to detect light received from the second area of the screen, and a processor configured to determine whether the first projection image and the second projection image projected onto the screen overlap or are separated based on the light received from the first area and the light received from the second area and to control the first projection image and the second projection (Continued)

image to be adjacent on the screen when the first projection image and the second projection image partially overlap or are separated. Accordingly, it is possible to seamlessly display a plurality of projection images.

13 Claims, 14 Drawing Sheets

(52) U.S. Cl.
CPC ......... *H04N 9/3147* (2013.01); *H04N 9/3182* (2013.01); *H04N 9/3194* (2013.01)

(58) Field of Classification Search
USPC .............. 348/747, 383, 745, 806; 359/201.1, 359/202.2; 353/30; 345/1.3
See application file for complete search history.

(56) References Cited

U.S. PATENT DOCUMENTS

| | | | |
|---|---|---|---|
| 2008/0144139 | A1 | 6/2008 | Yeo |
| 2010/0321382 | A1* | 12/2010 | Amaratunga ............ H04N 5/74 345/419 |
| 2014/0307230 | A1* | 10/2014 | Hajjar .................. H04N 9/3129 353/30 |

FOREIGN PATENT DOCUMENTS

| | | |
|---|---|---|
| KR | 10-2012-0069187 A | 6/2012 |
| KR | 10-2012-0092090 A | 8/2012 |

* cited by examiner

DISPLAY APPARATUS CAPABLE OF SEAMLESSLY DISPLAYING A PLURALITY OF PROJECTION IMAGES ON SCREEN

CROSS-REFERENCE TO RELATED PATENT APPLICATIONS

This application is a U.S. National Stage Application under 35 U.S.C. §371 of PCT Application No. PCT/KR2014/001670, filed Feb. 28, 2014, which claims priority to Korean Patent Application No. 10-2013-0097383, filed Aug. 16, 2013, whose entire disclosures are hereby incorporated by reference.

TECHNICAL FIELD

The present invention relates to a display apparatus, and, more particularly, to a display apparatus capable of seamlessly displaying a plurality of projection images on a screen.

BACKGROUND ART

A display apparatus displays an image. A projector which is one of display apparatus projects an image onto a screen.

In order to display an image on a large screen, a plurality of projectors is necessary. U.S. patent application Ser. No. 11/948,927 discloses a plurality of projectors used to display an image on a large screen.

According to U.S. patent application Ser. No. 11/948,927, in order to form a large screen using several projectors, a camera is placed in front of the screen, images are projected onto the screen using the projectors at the back of the screen, and an overlapping area of two images is extracted using a phenomenon that the brightness of an overlapping area of several images increases, thereby controlling the locations of the projectors or the color of the image.

However, according to this method, it is difficult to detect the overlapping area of the projection images or it takes significant time to detect the overlapping area of the projection images. In addition, it is difficult to cope with change in locations of the projectors due to external shock or for different reasons.

DISCLOSURE

Technical Problem

Therefore, the present invention has been made in view of the above problems, and it is an object of the present invention to provide a display apparatus capable of seamlessly displaying a plurality of projection images on a screen.

Technical Solution

In accordance with an aspect of the present invention, the above and other objects can be accomplished by the provision of a display apparatus including a screen having a reflective member formed in at least a portion thereof, a first scanner configured to output a first projection image to a first area of the screen by first-direction scanning and second-direction scanning, a second scanner configured to output a second projection image to a second area of the screen by first-direction scanning and second-direction scanning, a first light detector configured to detect light received from the first area of the screen, a second light detector configured to detect light received from the second area of the screen and a processor configured to determine whether the first projection image and the second projection image projected onto the screen overlap or are separated based on the light received from the first area and the light received from the second area and to control the first projection image and the second projection image to be adjacent to each other on the screen when the first projection image and the second projection image partially overlap or are separated.

In accordance with an aspect of the present invention, there is provided a display apparatus including a screen having a reflective member formed in at least a portion thereof, a first scanner configured to output a first projection image to a first area of the screen by first-direction scanning and second-direction scanning, a second scanner configured to output a second projection image to a second area of the screen by first-direction scanning and second-direction scanning, a light detector configured to detect light received from the screen and a processor configured to determine whether the first projection image and the second projection image projected onto the screen overlap or are separated based on the light received after being reflected from the reflective member and to control the first projection image and the second projection image to be adjacent to each other on the screen when the first projection image and the second projection image partially overlap or are separated.

Advantageous Effects

The display apparatus according to one embodiment of the present invention projects a first projection image and a second projection image onto a screen having a reflective member formed in at least a portion thereof using a first scanner and a second scanner, outputs light to the screen, determines whether the first projection image and the second projection image projected onto the screen overlap or are separated and controls the first projection image and the second projection image to be adjusted on the screen when the first projection image and the second projection image overlap or are separated. Therefore, it is possible to seamlessly display a plurality of projection images on the screen.

In particular, whether the projection images overlap or are separated on the screen may be rapidly determined based on the output light based on the infrared light and the received light corresponding thereto, and the scanning angle of the scanner, the scan area or the active area of the scan area is adjusted such that immediate response is possible.

By forming a plurality of pattern members or a reflective coating member on the screen, it is possible to easily determine whether the first projection image and the second projection image overlap or are separated using light received after being scattered or reflected from the pattern members or the reflective coating member.

According to the display apparatus, it is possible to simply and rapidly determine whether the projection images overlap or are separated when components of the display apparatus move due to vehicle vibration. Therefore, the first projection image and the second projection image can be controlled not to overlap or not to be separated, that is, to be adjacent, on the screen.

BEST MODE

Exemplary embodiments of the present invention will be described in detail with reference to the attached drawings.

The terms "module" and "unit" attached to describe the names of components are used herein to aid in understanding of the components and thus they should not be considered as having specific meanings or roles. Accordingly, the terms "module" and "unit" may be used interchangeably.

The display apparatus described in the present specification refers to a display apparatus which can display a plurality of projection images on a screen using a scanning method and, more particularly, a display apparatus for adjacently displaying a plurality of projection images on a single screen using the scanning method without overlapping or separating the plurality of projection images.

The display apparatus may include a scanner for outputting a projection image using a scanning method. In particular, the display apparatus may include a plurality of scanners respectively corresponding to the plurality of projection images. Each scanner may output light for determining whether the images projected onto the screen overlap or are separated, in addition to the projection images.

The display apparatus may receive light scattered or reflected from the screen and determine whether the projection images overlap or are separated on the screen based on a difference between the output light and the received light. When the projection images overlap or are separated, the scan angle of the scanner, a scan area or an active area of the scan area are adjusted, such that the projection images are adjacently, that is, seamlessly, displayed.

Such a display apparatus may be included in home appliances such as a mobile terminal, a TV, a set-top box, a media player, a game console, an air conditioner, a refrigerator, a washing machine, a cooker, a robot cleaner, etc. and may be included in vehicles.

Hereinafter, such a display apparatus will be described in detail.

Figure 1:
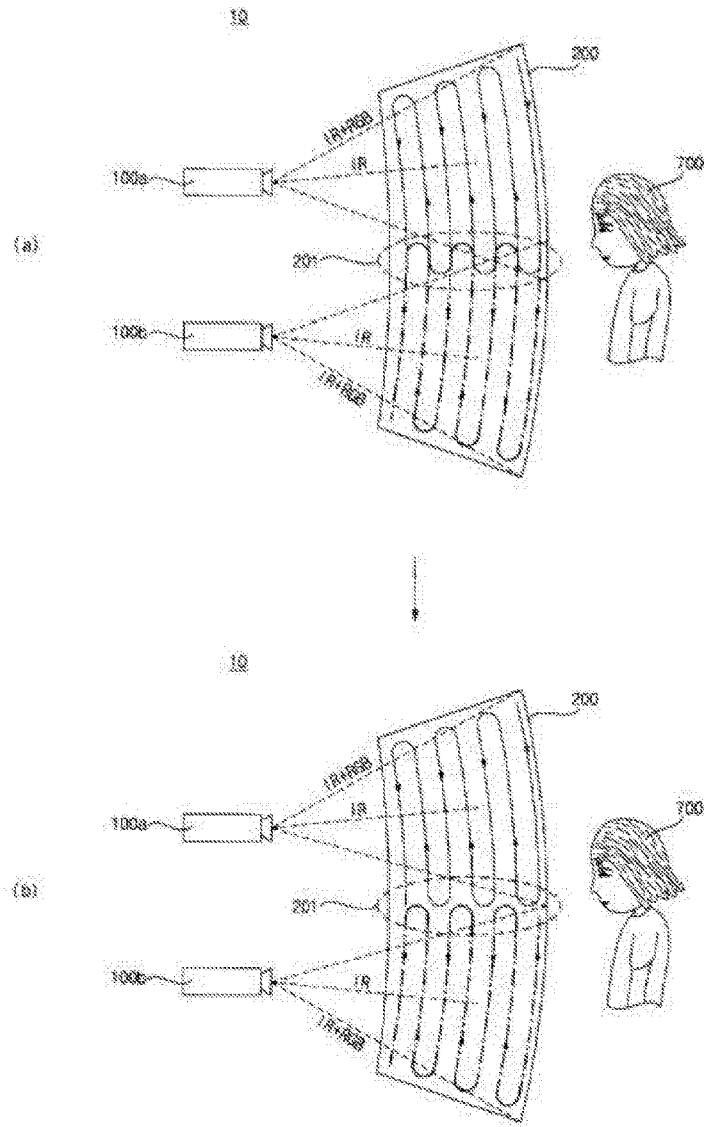
FIG. 1 is a diagram showing the concept of a display apparatus according to one embodiment of the present invention.

FIG. 1 is a diagram showing the concept of a display apparatus according to one embodiment of the present invention.

Referring to FIG. 1, the display apparatus 10 may include light output modules 100a and 100b and a screen 200.

Each of the light output modules 100a and 100b may output projection images based on visible light and light for detecting the distance to an external object by first-direction scanning and second-direction scanning, receive light corresponding to the output light, and detect the distance to the external object based on the output light and the received light. In particular, it is possible to determine whether the projection images displayed on the screen overlap or are separated.

Each of the light output modules 100a and 100b may include a 2D scanner for outputting a projection image and output light using a scanning method.

More specifically, FIG. 1(a) shows the case in which the first light output module 100a outputs a first projection image based on visible light RGB and output light IR based on infrared light in a first area of the screen 200 and the second light output module 100b outputs a second projection image based on visible light RGB and output light IR based on infrared light to a second area of the screen 200.

A user 700 who is at the opposite side of the light output modules 100a and 100b, that is, in front of the screen 200, can view the first projection image and the second projection image displayed on the screen. Such a projection method may be referred to as a rear projection type.

Since the screen 200 is large, if a plurality of projection images is output using a plurality of light output modules, as shown in FIG. 1(a), an overlapping area 201 in which the projection images overlap may be generated.

In order to remove the overlapping area of the projection images, in the present invention, the output light is used along with the projection image. Using the light received due to scattering or reflection of the output light from the screen, it is possible to acquire the distance to the screen and the distance image of the screen. By comparing the distance images, it is possible to determine whether an overlapping area or separated area of the projection images is generated.

When the projection images overlap, it is possible to adjust the scan angle of the scanner for outputting each projection image, to adjust the location or size of the scan area or to adjust the location or size of the active area of the scan area.

By such a method, as shown in FIG. 1(b), the projection images can be adjacently, that is, seamlessly, displayed.

Figure 2:
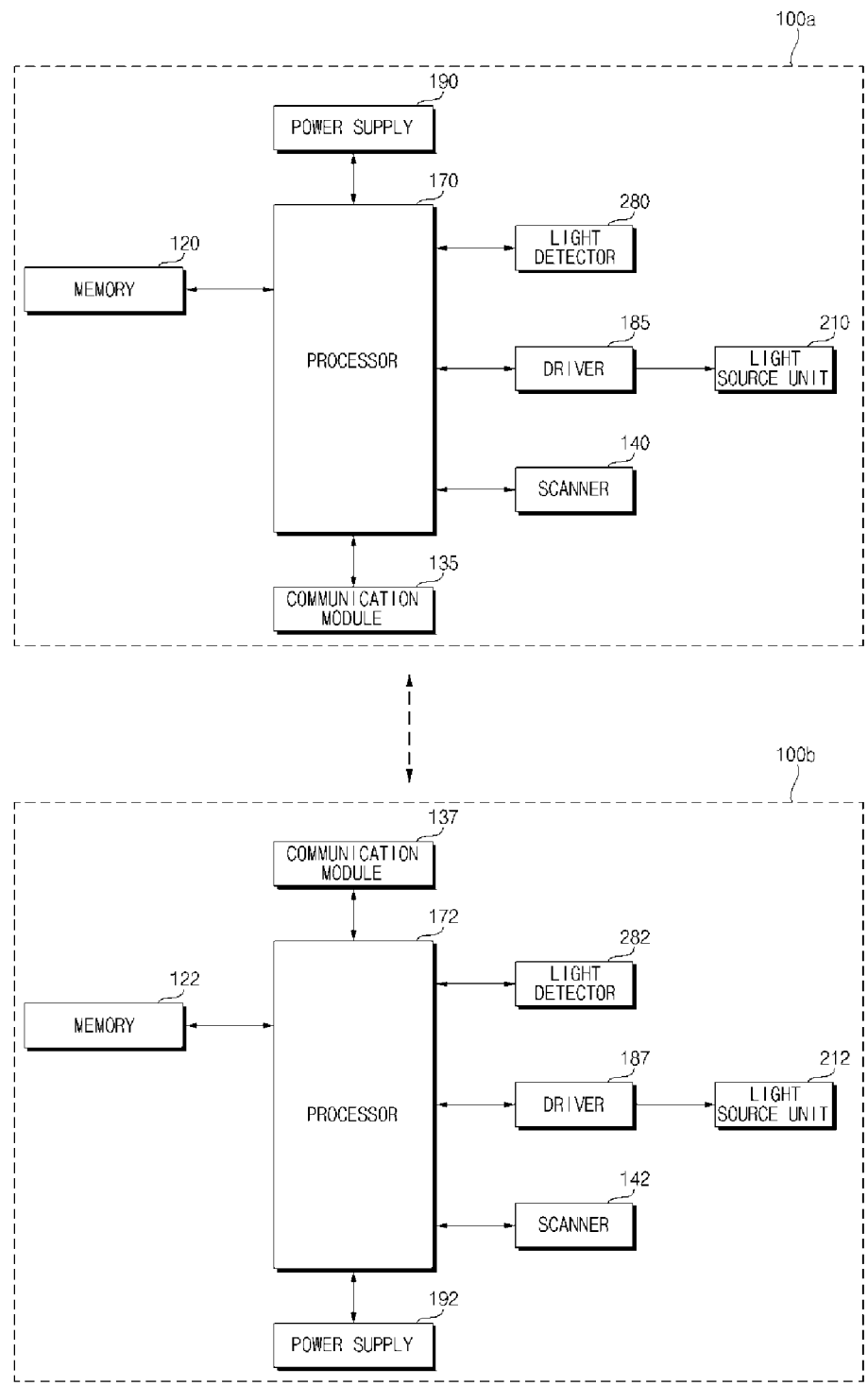
FIG. 2 is a block diagram showing the internal configuration of an example of the display apparatus of FIG. 1.

FIG. 2 is a block diagram showing the internal configuration of an example of the display apparatus of FIG. 1.

Referring to FIG. 1, each of the light output modules 100a and 100b of the display apparatus 10 outputs a projection image and output light using a time of flight (TOF) method.

First, the first light output module 110a may include a memory 120, a scanner 140, a processor 170, a communication module 135, a driver 185, a power supply 190, a light source unit 210 and a light detector 280.

The memory 120 may be responsible for storing a program for processing and controlling the processor 170 or temporarily storing input/output data (e.g., still images, moving images, etc.).

The communication module 135 serves as an interface with all external devices connected to the first light output module 100a by wire or wirelessly. The communication module 135 may receive data or power from such external devices and deliver the data or power to the internal components of the first light output module 100a, and transmit internal data of the light output module 100 to the external devices.

In particular, the communication module 135 may receive a wireless signal or a wired signal from the adjacent second light output module 100b. Here, the wireless or wired signal may include an electrical signal based on the received light corresponding to the output light which is output from the second light output module 100b to the screen 200.

The scanner 140 may sequentially and repeatedly perform first-direction scanning and second-direction scanning using input light and externally output light.

Light input to the scanner 140 may include visible light corresponding to the projection image and output light for detecting the distance to the external object. The output light may be infrared light.

The scanner 140 may perform scanning with respect to an external scan area in frame units while sequentially and repeatedly performing left-to-right scanning and right-to-left scanning with respect to the external scan area. By such scanning, the first projection image based on visible light and the output light can be output to the external scan area.

The processor 170 may perform overall control operation of the first light output module 100a. More specifically, the processor can control operation of each unit of the light output module 100.

The processor 170 can control output of a video image stored in the memory 120 or a video image received from an external device via the communication module 135 to the external scan area as the projection image.

The processor 170 may control the driver 185 for controlling the light source unit 210 for outputting visible light RGB. More specifically, the RGB signal corresponding to the video image to be displayed may be output to the driver 185.

The processor 170 may transmit an electrical signal corresponding to the output light to the driver 185, in order to detect the distance to the external object.

The processor 170 can control operation of the scanner 140. More specifically, first-direction scanning and second-direction scanning may be sequentially and repeatedly performed to control external output.

The processor 170 may detect the distance to the external object based on the electrical signal corresponding to the output light transmitted to the driver 185 and the electrical signal based on the received light received by the light detector 280.

For example, the processor 170 may detect the distance to the external scan area 40 using a phase difference between the electrical signal corresponding to the output light and the electrical signal corresponding to the received light.

The processor 170 may determine whether the first projection image and the second projection image projected onto the screen overlap or are separated based on the light output to the screen and the light received after being scattered or reflected from the screen 200, and control the scanner 140 such that the first projection image and the second projection image are adjacent on the screen 200 when the projection images overlap or are separated.

The processor 170 may receive, from the communication module 135, the electrical signal based on the received light corresponding to the output light from the second light output module 100b to the screen 200.

In the embodiment of the present invention, using such attributes, if a plurality of projection images is displayed on a single large screen, it is possible to control the projection images to be adjacently displayed on the screen 200 in a state in which the projection images do not overlap or are not separated.

The light source unit 210 may include a blue light source for outputting blue light, a green light source for outputting green light and a red light source for outputting red light. Each light source may be implemented by a laser diode or a light emitting diode (LED).

The light source unit 210 may include an infrared light source for outputting infrared light.

The light detector 280 may detect light received from an external device in correspondence with the output light and convert the detected light into an electrical signal. The light detector 280 may include a photodiode for converting a light signal into a received signal, that is, an electrical signal. In particular, the light detector 280 may include an avalanche photodiode for converting light received after being scattered from an external object into an electrical signal as a photodiode having high photoelectric efficiency.

The light detector 280 may include a charge coupled device (CCD) or a complementary metal-oxide semiconductor (CMOS) sensor, in order to detect the received light of infrared light if the output light is infrared light.

Although not shown in the figure, a sampler (not shown) for converting an analog signal into a digital signal may be further included between the light detector 280 and the processor 170.

The driver 185 may control output of red light, green light and blue light from the red light source, the green light source and the blue light source of the driver 185 in correspondence with the RGB signal received from the processor 170.

The driver 185 may control output of infrared light from the infrared light source of the driver 185 in correspondence with the electrical signal corresponding to the output light received from the processor 170.

The power supply 190 may receive external or internal power and supply power necessary for operation of the components, under control of the processor 170.

Next, the second light output module 100b may include a memory 122, a scanner 142, a processor 172, a communication module 137, a driver 187, a power supply 192, a light source unit 212 and a light detector 282.

The components of the second light output module 100b correspond to the components of the first light output module 100a and a description thereof will be omitted.

The communication module 137 may exchange data with the communication module 135 of the first light output module 100a. For example, the communication module may receive, from the first light output module 100a, the electrical signal based on the received light corresponding to the output light output from the first light output module 100a to the screen 200.

The processor 172 may determine whether the first projection image and the second projection image projected onto the screen overlap or are separated based on the output light output to the screen 200 and the light received after being scattered or reflected from the screen 200 and control the scanner 140 such that the first projection image and the second image are adjacent on the screen 200 when the projection images overlap or are separated.

The processor 170 may receive, from the communication module 135, the electrical signal based on the received light corresponding to the output light from the second light output module 100b to the screen 200.

Figure 3:
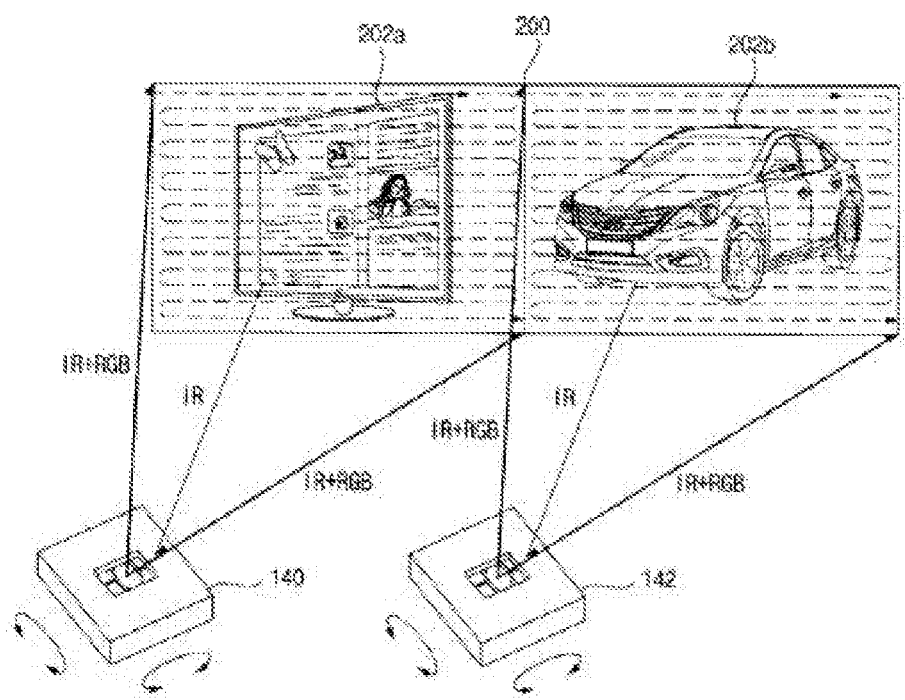
FIG. 3 is a diagram showing simultaneous output of projection images and light for distance detection from first and second light output modules of FIG. 1.

FIG. 3 is a diagram showing simultaneous output of projection images and light for distance detection from first and second light output modules of FIG. 1.

Referring to FIG. 3, the scanners 140 and 142 of the light output module 110a and 110b according to the embodiment of the present invention may sequentially and repeatedly perform first-direction scanning and second-direction scanning using the input light and output light to the external scan area.

In the figure, the first projection image 202a based on visible light RGB and the output light IR based on infrared light are output from the first light output module 100a in a first area of the screen 200 of FIG. 1 and the second projection image 202b based on visible light RGB and the output light based on infrared light are output from the second light module 100b in a second area of the screen 200.

Hereinafter, the internal configuration of the light output modules and, more particularly, the first light output module 100a will be described in greater detail.

Figure 4:
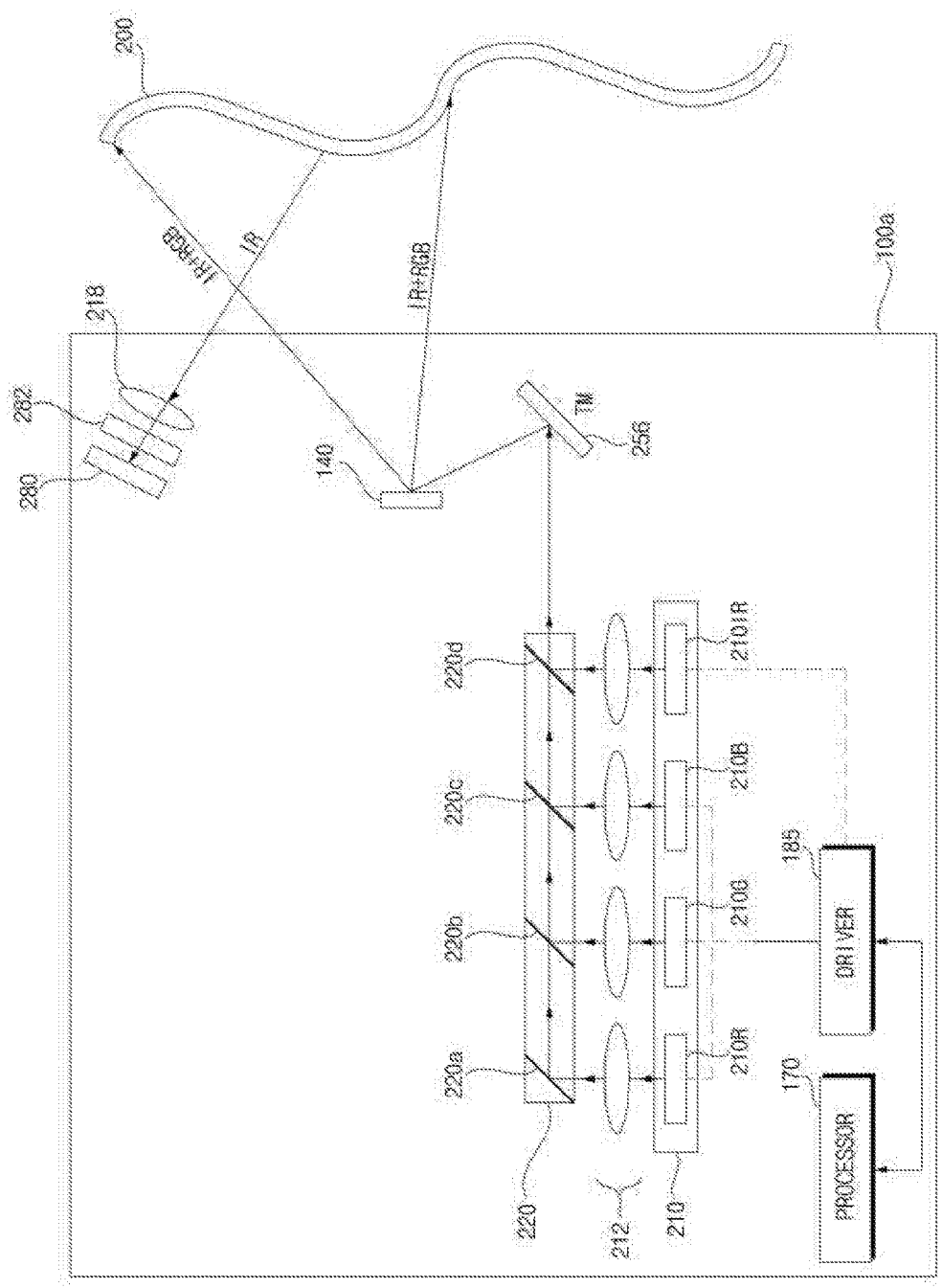
FIG. 4 is a diagram showing an example of the first light output module of FIG. 1.

FIG. 4 is a diagram showing an example of the first light output module of FIG. 1.

Referring to the figure, the first light output module 100a of FIG. 4 may include the light source unit 210 including a plurality of light sources. That is, the first light output module may include a red light source 210R, a green light source 210G, a blue light source 210B, and an output light source 210IR for outputting infrared light. Each of the light sources 210R, 210G and 210B may include a laser diode.

Each of the light sources 210R, 210G, 210B and 210IR may be driven by each electrical signal from the driver 185 and the electrical signal of the driver 185 may be generated under control of the processor 170. The output light source 210IR may output the light via the electrical signal corresponding to the output light.

The light output from each of the light sources 210R, 210G, 210B and 210IR is collimated via a collimator lens of a collimator 212.

A light synthesizer 220 synthesizes light output from the light sources 210R, 210G, 210B and 210IR and outputs light in one direction. The light synthesizer 220 may include four 2D microelectromechanical system (MEMS) mirrors 220a, 220b, 220c and 220d.

That is, the first light synthesizer 220a, the second light synthesizer 220b, the third light synthesizer 220c and the fourth light synthesizer 220d output red light from the red light source 210R, green light from the green light source 210G, blue light from the blue light source 210B and the output light from the output light source 210IR toward the scanner 140, respectively.

A light reflector 256 reflects the red light, green light, blue light and output light passing through the light synthesizer 220 toward the scanner 140. The light reflector 256 reflects light of various wavelengths and may be implemented by a total mirror (TM).

The scanner 140 may receive visible light RGB and output light IR from the light source unit 210 and sequentially and repeatedly perform first-direction scanning and second-direction scanning. The scanning operation may be repeatedly performed over the entire external scan area.

In particular, visible light RGB and output light IR output from the scanner 140 may be output to a first area of the screen 200.

Similarly, the second light output module 100b may include a light source unit including a plurality of light sources, a light synthesizer, a light reflector and a scanner 142. Visible light RGB and output light IR output from the scanner 142 may be output to a second area of the screen 200.

Since a user who is at the opposite side of the first light output module 100a recognizes the projection images projected onto the screen 200, this method may be referred to as rear projection.

The light received after being scattered or reflected from the screen 200 may be input to the light detector 280 via a collimator 218 and an infrared light transmitting filter 282.

The light detector 280 may detect externally received light in correspondence with the output light and convert the detected light into an electrical signal.

The processor 170 determines whether the first projection image and the second projection image displayed on the screen overlap or are separated based on the electrical signal corresponding to the output light and the electrical signal corresponding to the received light and controls the first projection image and the second projection image to be adjacent on the screen when the projection images overlap or are separated. Accordingly, it is possible to seamlessly display a plurality of projection images on a screen.

According to the embodiment of the present invention, since visible light is output from the scanner 140, even when the screen 200 for displaying the projection image has a free-form surface, it is possible to display the projection image in correspondence with the free-form surface of the screen. For example, it is possible to check the state of the free-form surface of the screen 200 by detecting the distance using the output light, to scale the displayed image in correspondence with the free-form surface and to display the scaled image. Therefore, free-form surface display is possible.

Figure 5:
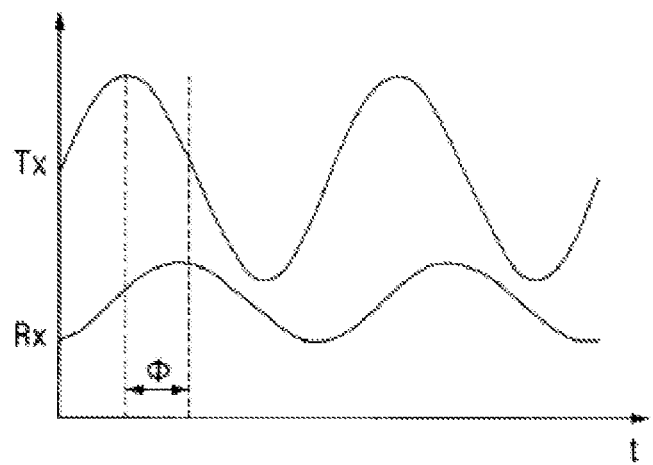
FIG. 5 is a view referred to for describing a distance detection method of the first light output module of FIG. 4.

FIG. 5 is a view referred to for describing a distance detection method of the first light output module of FIG. 4.

Referring to FIG. 5, the distance to the screen of FIG. 4 may be detected based on a phase difference between the electrical signal of the output light and the electrical signal of the received light.

Tx of the figure denotes an example of the electrical signal of the output light and Rx denotes an example of the electrical signal of the received light.

The processor 170 may calculate distance information according to the phase difference $\Phi$ between the electrical signal of the output light and the electrical signal of the received light and detect touch input or gesture input based on the distance information.

FIGS. 6 to 13 are views referred to for describing a method for operating the display apparatus of FIG. 1.

Hereinafter, assume that a reflective member is formed on the screen 200 in order to increase the intensity of the received light corresponding to the output light. The reflective member may include a reflective coating member shown in FIG. 6(*b*) or a plurality of pattern members shown in FIG. 12.

Figure 6:
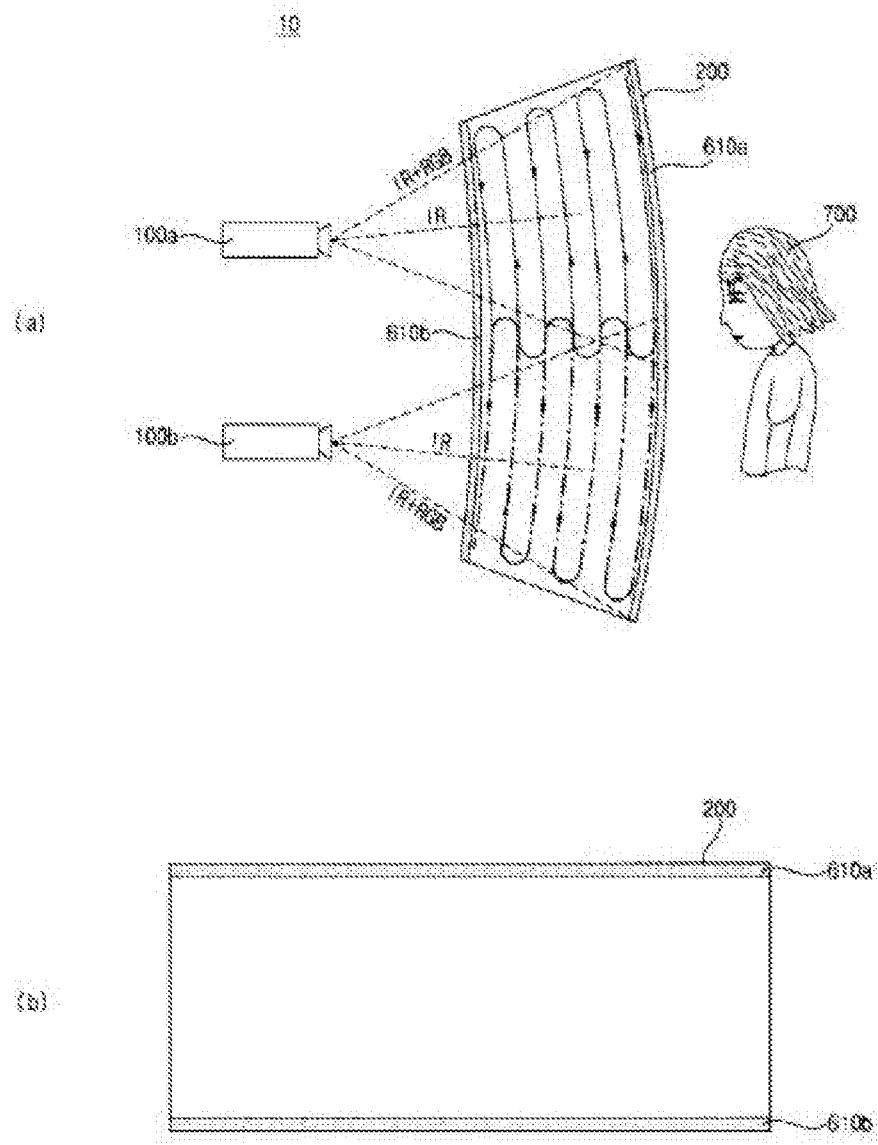
FIGS. 6 to 13 are views referred to for describing a method for operating the display apparatus of FIG. 1.

First, (a) of FIG. 6 shows the case in which the first light output module 100a outputs the first projection image based on visible light RGB and the output light IR based on infrared light to the first area of the screen 200 and the second light output module 100b outputs the second projection image based on visible light RGB and the output light IR based on the infrared light to the second area of the screen 200. At this time, an overlapping area 201 in which the projection images overlap may be generated.

(b) of FIG. 6 shows infrared reflective coating members 610a and 610b formed on upper and lower areas of the screen 200.

The infrared reflective coating member further increases the intensity of the light received after being reflected from the screen, such that the processor 170 may more easily detect the distance to the screen and the area to the screen.

Figure 7:
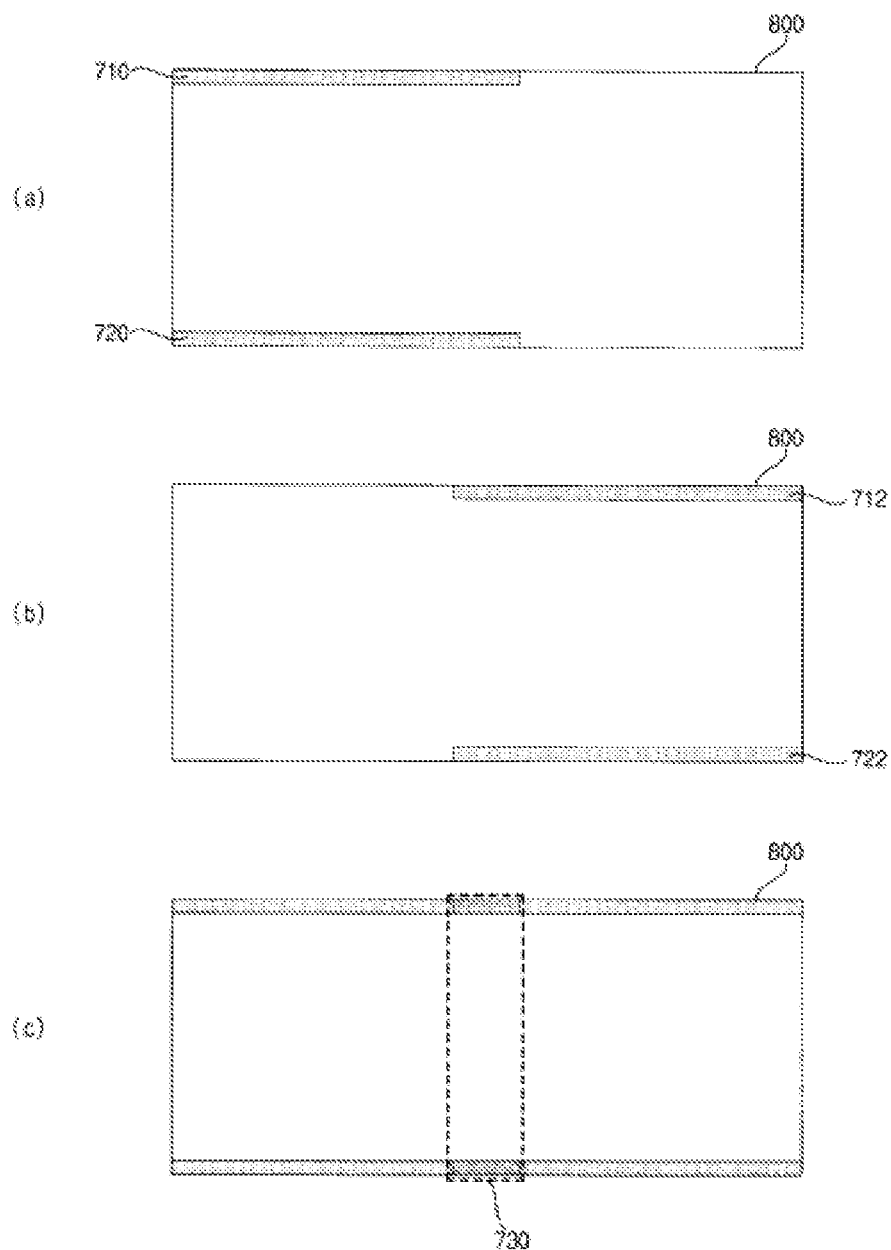
Figure 8:
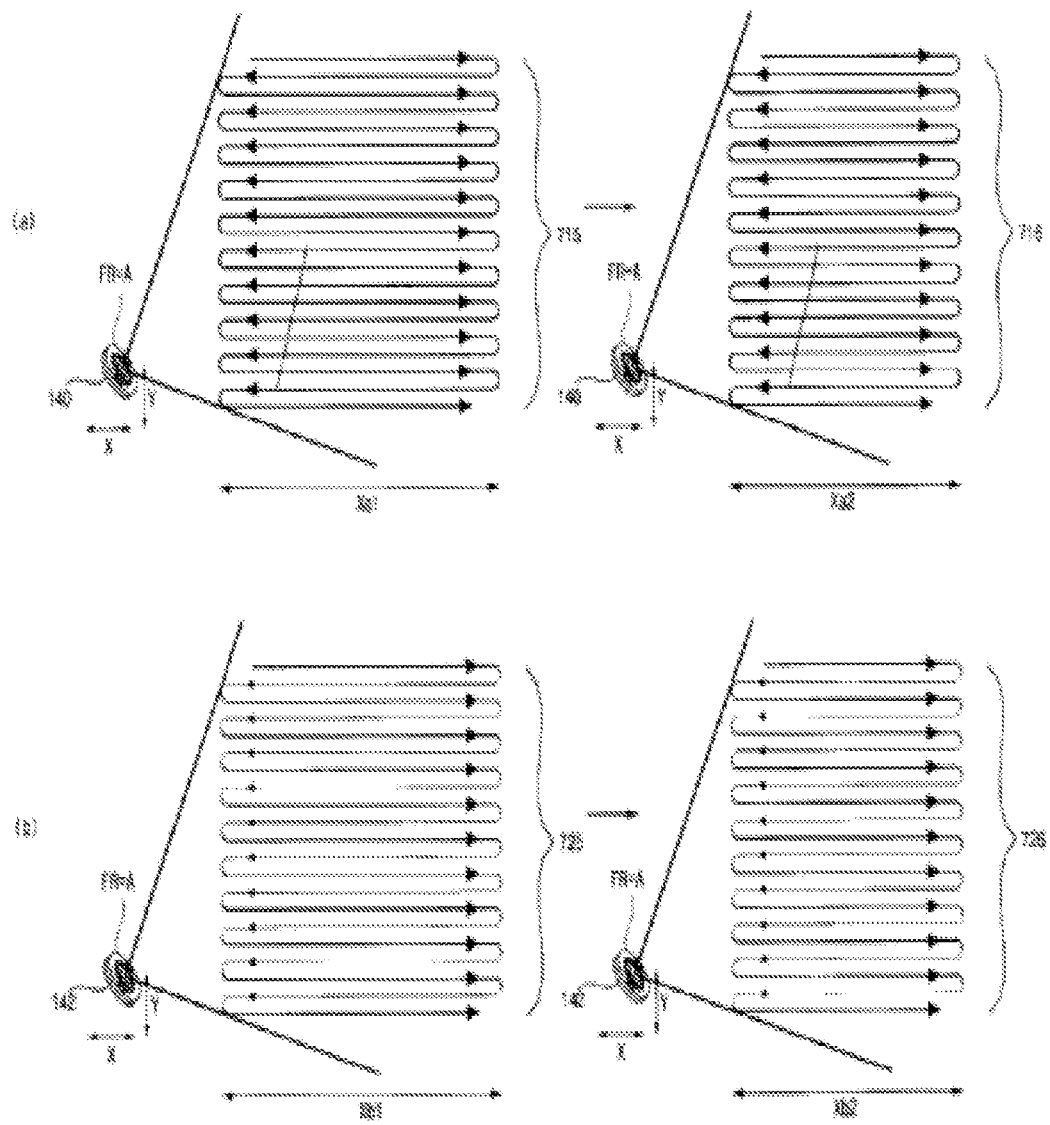

For example, when the first light output module 100a and the second light output module 100b alternately output light, it is possible to acquire distance detection images shown in FIGS. 7(*a*) and 7(*b*).

First, the processor 170 of the first light output module 100a may perform distance detection based on the output light output to the first area of the screen 200 and the received light corresponding thereto and generate a distance detection image 800. At this time, the distance detection image may be indicated by a luminance component. The luminance of the distance detection image is high if the distance is small and is low if the distance is large.

Since the intensity of the light received after being scattered or reflected in the upper and lower areas is increased by the infrared reflective coating members 610a and 610b respectively formed in the upper and lower regions of the screen 200, the luminance of the areas 710 and 720 in the distance detection image 800 is highest. Accordingly, it is possible to acquire the distance detection image shown in FIG. 7(a).

Similarly, the processor 172 of the second light output module 100b may perform distance detection based on the output light output to the second area of the screen 200 and the received light corresponding thereto and generate the distance detection image 800 according to distance detection.

When the electrical signal of the received light corresponding to the output light output to the second area of the screen 200 is delivered to the first light output module 100a, the processor 170 of the first light output module 100a may generate the distance detection image 800.

Since the intensity of the light received after being scattered or reflected in the upper and lower areas is increased by the infrared reflective coating members 610a and 610b respectively formed in the upper and lower areas of the screen 200, the luminance of the areas 712 and 722 in the distance detection image 800 is highest. Accordingly, it is possible to acquire the distance detection image shown in FIG. 7(b).

The processor 170 of the first light output module 100a or the processor 172 of the second light output module 100b may combine the distance detection images of FIGS. 7(a) and 7(b) to acquire the distance detection image 800 shown in FIG. 7(c).

FIG. 7(c) shows overlapping of a center area 730 of the distance detection image 800.

The processor 170 of the first light output module 100a or the processor 172 of the second light output module 100b may determine whether the first projection image and the second projection image projected onto the screen 200 overlap.

That is, in the present invention, since an RGB camera is not used but infrared light is used, it is possible to rapidly detect overlapping or separation of the projection images regardless of the luminance of the projection images.

When the first projection image and the second projection image overlap, the processor 170 of the first light output module 100a may adjust the scanning angle of the scanner 140 and the processor 172 of the second light output module 100b may adjust the scanning angle of the scanner 142.

The distance detection images of FIGS. 7(a) and 7(b) may be acquired even when the first light output module 100a and the second light output module 100b simultaneously output light.

FIG. 8(a) shows the case in which the left-right scanning angle of the scanner 140 is adjusted such that the left-right size Xa1 of the scan area 715 scanned by the scanner 140 is changed to the left-right size Xa2 of the scan area 716.

FIG. 8(b) shows the case in which the left-right scanning angle of the scanner 142 is adjusted such that the left-right size Xb1 of the scan area 725 by the scanner 142 is changed to the left-right size Xb2 of the scan area 726.

Figure 10:
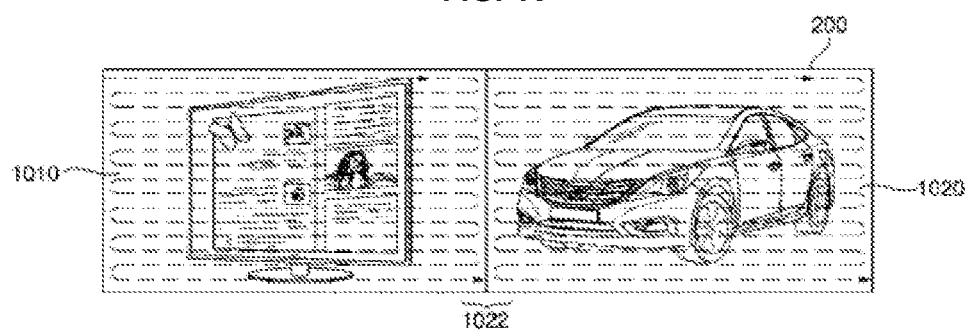

As shown in FIG. 10, the adjacent projection images, that is, the seamless projection images 1010 and 1020, may be displayed on the screen 200 in a state in which the projection images do not overlap or are not separated in the center area 1022.

The scan area scanned by the scanner refers to an area in which scanning is performed by the scanner and may be divided into a blank area in which light is not actually transmitted or output or an active area in which light is actually transmitted or output.

When the first projection image and the second projection image overlap, the processor 170 of the first light output module 100a can adjust the angle of the scan area of the scanner 140 or the active area of the scan area and the processor 172 of the second light output module 100b can adjust the angle of the scan area or the active area of the scan area.

FIG. 9(a) shows the case in which the scanner 140 adjusts, that is, reduces, the size of the scan area such that a scan area 900 by the scanner 140 is changed to a scan area 905. Therefore, an active area 910 may be changed to an active area 915.

FIG. 9(b) shows the case in which the scanner 142 adjusts, that is, reduces, the size of the scan area such that a scan area 920 by the scanner 140 is changed to a scan area 925. Therefore, an active area 930 may be changed to an active area 935.

As shown in FIG. 10, the adjacent projection images, that is, the seamless projection images 1010 and 1020, may be displayed on the screen 200 in a state in which the projection images do not overlap or are not separated in the center area 1022.

Figure 9:
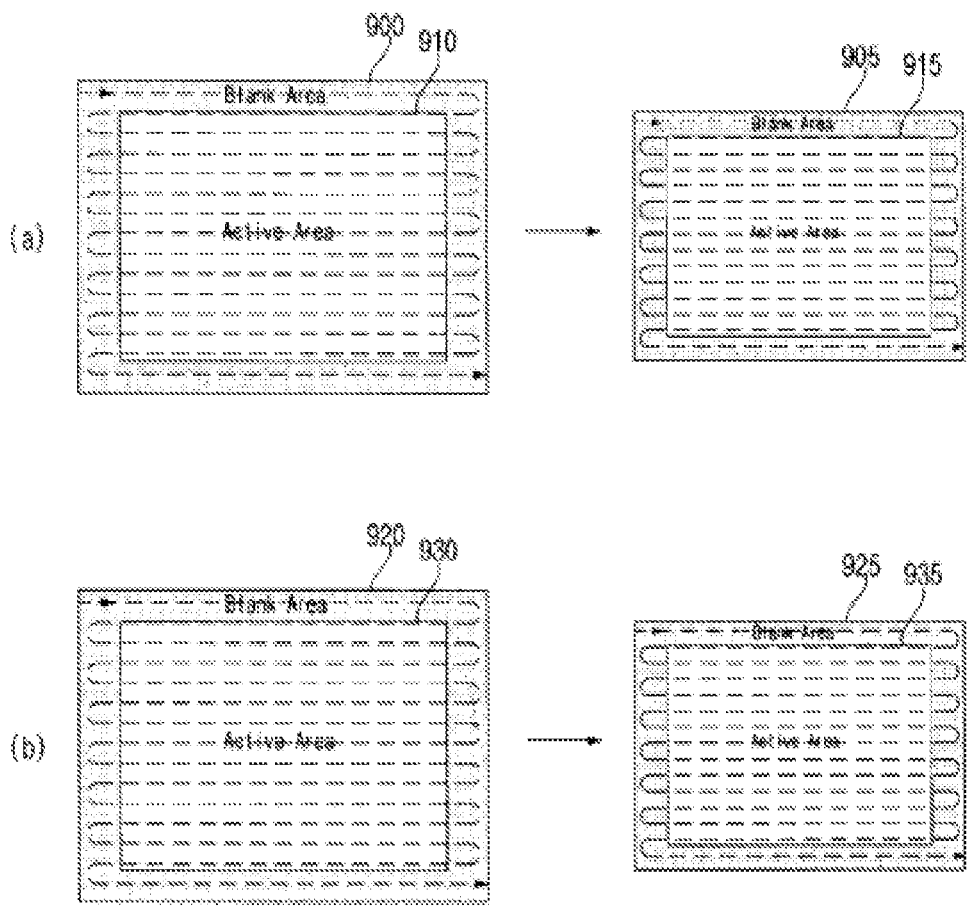

Unlike FIG. 9, the size of the scan area is not changed, but only the size or location of the active area may be adjusted.

Figure 11:
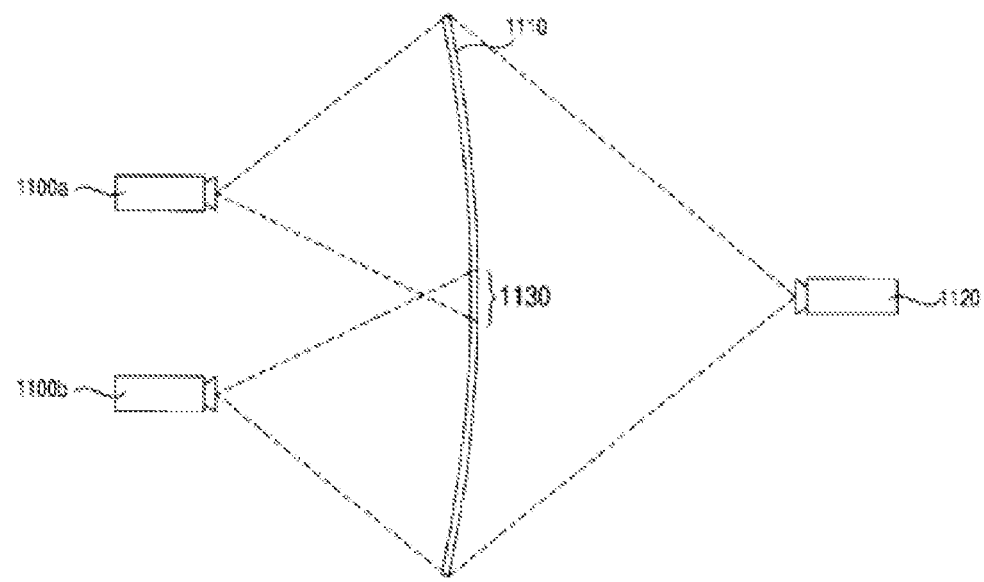

FIG. 11 shows a method for detecting overlapping of the projection images according to the related art.

In order to make a large screen using several projectors 1100a and 1100b, a camera 1120 is placed in front of the screen, images are projected onto the screen 1120 using the projectors 1100a and 1100b at the back of the screen, an overlapping area 1130 of the two images is extracted using a phenomenon that the brightness of an overlapping area of several images increases, thereby controlling the locations of the projectors or the color of the image.

However, according to this method, the luminance of the projection images should be high in order to detect the overlapping area 1130. Therefore, it is difficult to detect the overlapping area 1130 of the projection images or it takes significant time to detect the overlapping area of the projection images. In addition, it is difficult to detect the overlapping area when the projection images separate. Further, it is difficult to cope with change in locations of the projectors due to external shock or for different reasons.

However, according to the method of the present invention, whether the projection images overlap or are separated on the screen may be rapidly determined based on the output light based on the infrared light and the received light corresponding thereto, and the scanning angle of the scanner, the scan area or the active area of the scan area is adjusted such that immediate response is possible.

Figure 12:
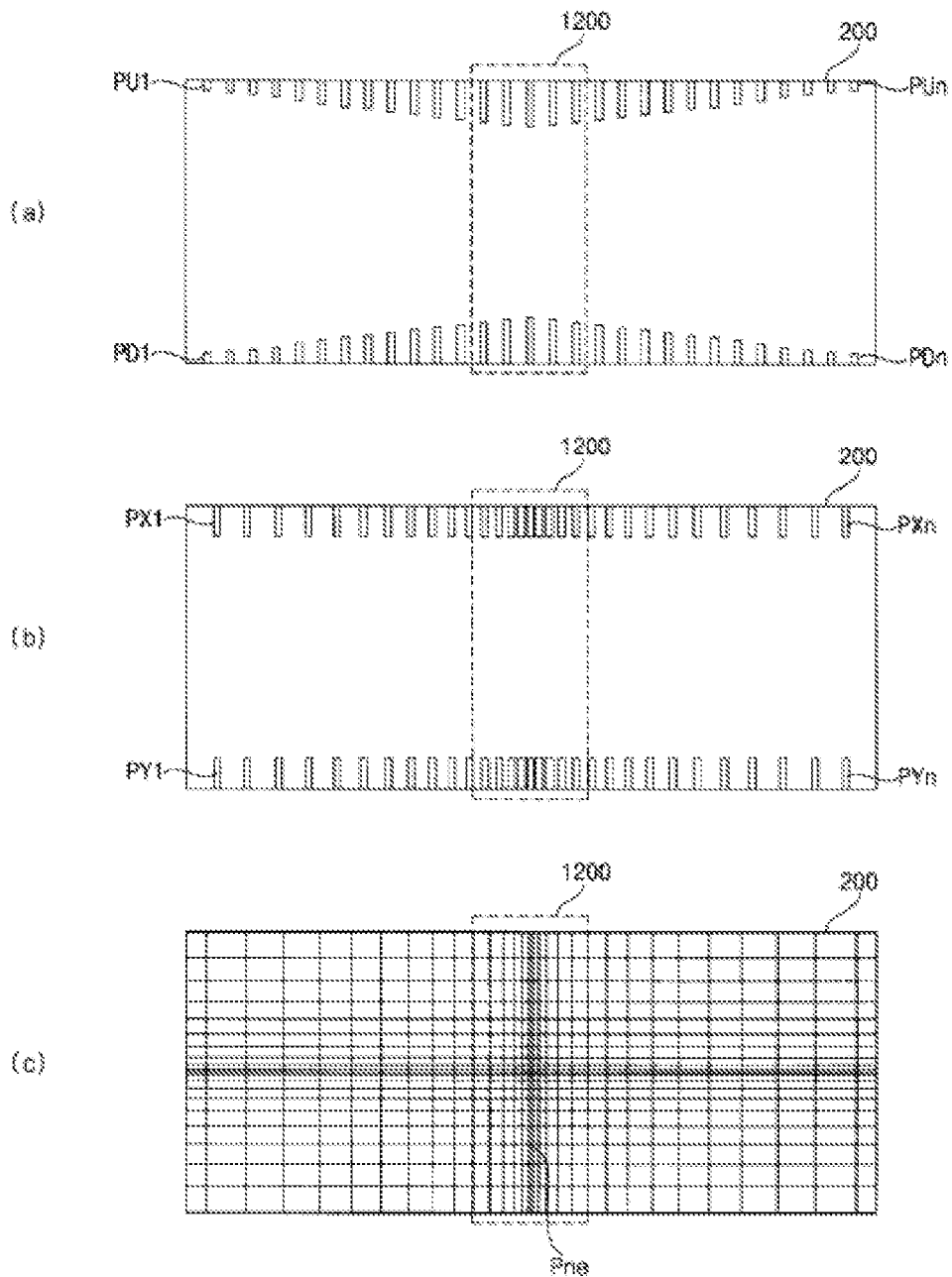

FIG. 12 is a diagram illustrating various examples of a pattern member formed on a screen according to an embodiment of the present invention.

First, FIG. 12(a) shows the case in which pattern members for reflection of infrared light are formed in upper and lower areas of the screen 200 and the sizes thereof are increased toward a center area 1200. More specifically, FIG. 12(a) shows the pattern members, the heights of which are increased toward the center area. In the figure, pattern members PU1, . . . , and PUn are formed in the upper area and pattern members PD1, . . . , and PDn are formed in the lower area.

The processor 170 of the first light output module 100a or the processor 172 of the second light output module 100b can accurately check the projection location of the first projection area and the projection location of the second projection area based on the light received after being scattered or reflected from the pattern members PU1, . . . , and PUn and PD1, . . . , and PDn.

That is, since the pattern members are differentiated and thus the received lights are differentiated, it is possible accurately check not only the projection location of the first projection area and the projection location of the second projection area but also the size of the overlapping area or the size of the separation area.

In particular, when the images are projected in a state in which the upper area and the lower area are twisted, the overlapping area of the upper area and the overlapping area of the lower area may be changed. Even in this case, it is possible to accurately check the overlapping areas of the upper and lower areas.

Next, FIG. 12(b) is similar to FIG. 12(a) but is different therefrom in that distances between the pattern members on the screen 200 are different. More specifically, the sizes of the pattern members for reflection of infrared light are constant but the distances between the pattern members are decreased toward the center area 1200. In the figure, the pattern members PX1, . . . , and PXn are formed in the upper area and the pattern members PY1, . . . , and PYn are formed in the lower area.

The processor 170 of the first light output module 100a or the processor 172 of the second light output module 100b can accurately check the projection location of the first projection area and the projection location of the second projection area based on the light received after being scattered or reflected from the pattern members PX1, . . . , and PXn and PY1, . . . , and PYn.

A combination of FIG. 12(a) and FIG. 12(b) is also possible. That is, the distances between and sizes of the pattern members formed on the screen may be differentiated.

Next, FIG. 12(c) shows cross-stripe pattern members for reflection of infrared light, which are formed on the screen. Unlike FIGS. 12(a) and 12(b) on which the pattern members are formed only in the upper and lower areas, the cross-stripe pattern members Pre are formed over the entire screen. In particular, as shown in the figure, the distances between the cross-stripe pattern members may be decreased toward the center area 1200.

The processor 170 of the first light output module 100a or the processor 172 of the second light output module 100b can accurately check the projection location of the first projection area and the projection location of the second projection area based on the light received after being scattered or reflected from the pattern members Pre.

Figure 13:
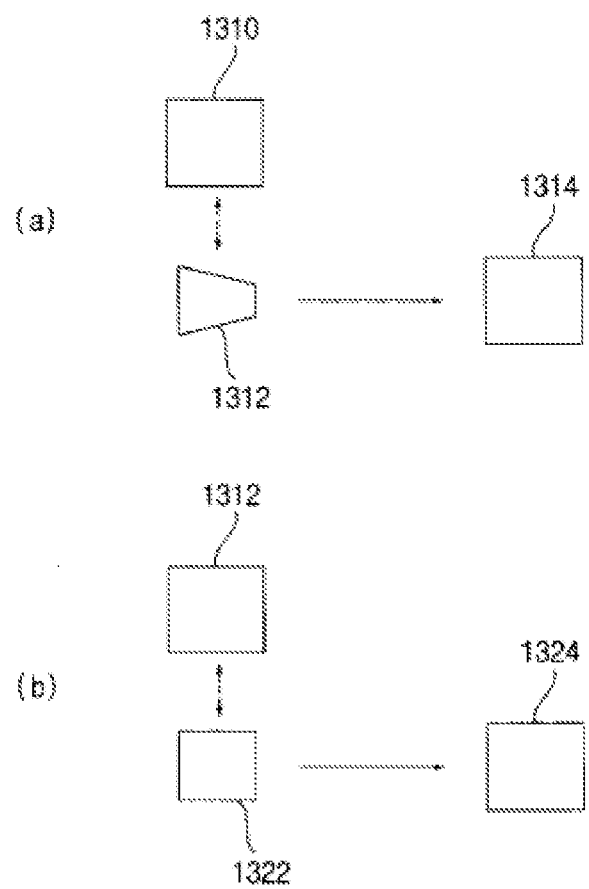

FIG. 13 shows control of the projection images by the processor 170 of the first light output module 100a or the processor 172 of the second light output module 100b.

For example, as shown in FIG. 13(a), when the image 1310 is projected onto the screen 200 in the form 1312 of reducing the size of a right portion of the image, the processor can control detection of this distortion and output of an image 1314 having an original form.

The processor 170 or the processor 172 may interpolate an image or enlarge a portion of the image to increase the size of the right portion. The interpolated or enlarged image may be projected such that the image 1314 having the original form is output on the screen.

As another example, as shown in FIG. 13(b), when the image is projected onto the screen 200 in the form 1322 of reducing the total size of the image, the processor can control detection of this reduction and output of an image 1324 having an original form.

The processor 170 or the processor 172 may scale the image to increase the size of the image. The enlarged image may be projected such that the image 1324 having the original form is output on the screen.

In contrast, the scanning angle of the scanner and the scan area may be adjusted. That is, scanning is performed such that the size of the right portion of the image is further increased in FIG. 13(a) or the scanning angle or the scan area is partially increased in FIG. 13(b).

Although the reflective coating members 610a and 610b are formed in FIG. 6, the various pattern members are formed in FIG. 12 and the location of the projection area is checked based on light received after being reflected or scattered from the reflective coating member or the pattern members in the above description, the location of the projection area may be checked even when the pattern members are not formed on the screen 200.

For example, when the coating member or the pattern members are not formed on the screen, a first distance detection image corresponding to an area in which the first projection image is projected may be acquired and a second distance detection image corresponding to an area in which the second projection image is projected may be acquired, based on the light output along with the first projection image.

The processor 170 may adjust a combination of the acquired first and second distance detection images according to the size of the screen, when knowing the size of the screen. That is, the first distance detection image and the second distance detection image may be combined and the size of the overlapping area may be checked, using the size of the screen.

Figure 14:
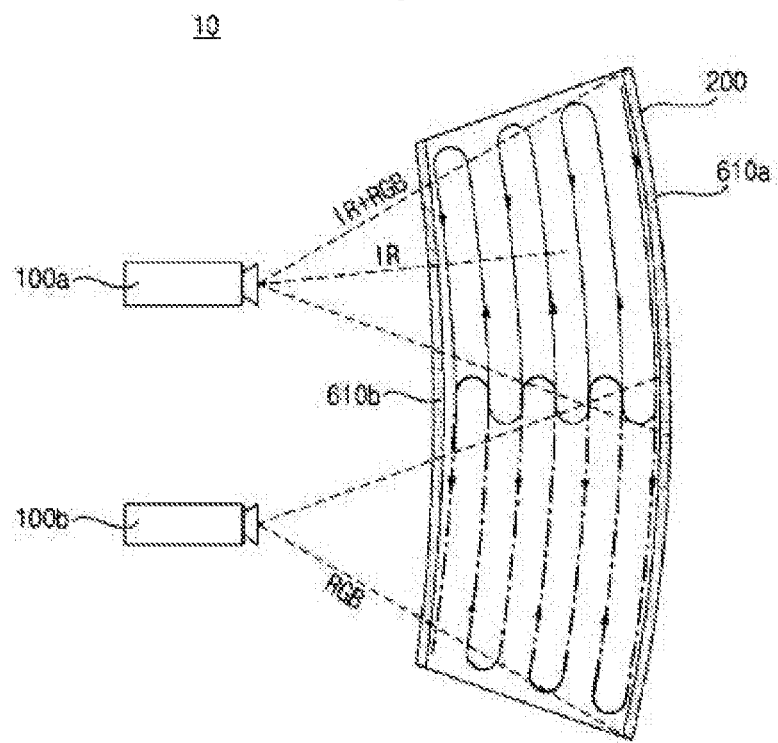
FIG. 14 is a diagram showing the concept of a display apparatus according to another embodiment of the present invention.

FIG. 14 is a diagram showing the concept of a display apparatus according to another embodiment of the present invention.

The display apparatus 10 of FIG. 14 is similar to the display apparatus 10 of FIG. 1, except that the first light output module 100a outputs a first projection image based on visible light RGB and output light IR based on infrared light to a first area of the screen 200 and the second light output module 100b outputs only a second projection image based on visible light RGB.

That is, the display apparatus 10 of FIG. 14 is different from the display apparatus 10 of FIG. 1 in that the second light output module 100 does not output the output light IR based on infrared light to the second area of the screen 200.

Even in this case, the processor 170 of the first light output module 100a may check the projection area of the first projection image and determine whether the first projection image and the second projection image overlap or are separated.

In particular, when the reflective coating member of FIG. 6(b) is formed or if the various pattern members of FIG. 12 are formed, the projection area of the first projection image is checked and whether the first projection image and the second projection image overlap or are separated are determined based on the projection area of the first projection image.

Figure 15:
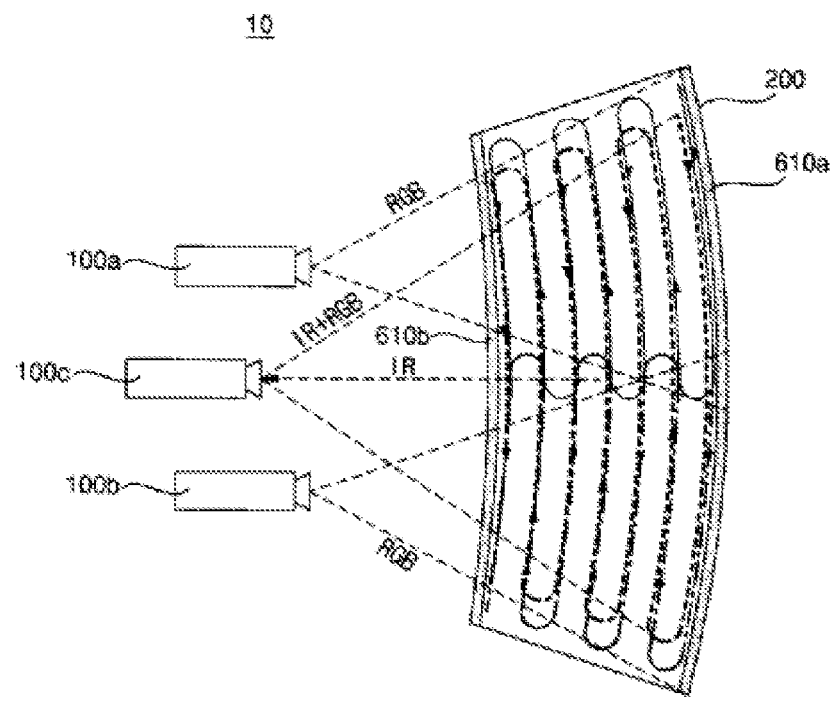
FIG. 15 is a diagram showing the concept of a display apparatus according to another embodiment of the present invention.

FIG. 15 is a diagram showing the concept of a display apparatus according to another embodiment of the present invention.

The display apparatus 10 of FIG. 15 is similar to the display apparatus 10 of FIG. 1 but is different therefrom in that the first light output module 100a and the second light output module 110b output only the first projection image and the second projection image based on visible light RGB and a third output module 100c outputs separate light.

The size of a scan area covered by a scanner (not shown) included in the third light output module 100c may correspond to the entire area of the screen 200.

A light detector (not shown) and a processor 170 included in the third light output module 100c may determine whether the first projection image and the second projection image overlap or are separated using light received after being reflected or scattered from the reflective coating member of FIG. 6(b) or the various pattern members of FIG. 12.

If the first projection image and the second projection image overlap or are separated, the processor 170 of the third light output module 100c may transmit overlapping or separation information to the first light output module 100a and the second light output module 100b or control the first light output module 100 and the second light output module 110b such that the projection images are adjacent to each other, that is, the projection images are seamlessly displayed.

The display apparatus according to the foregoing embodiments is not restricted to the embodiments set forth herein. Therefore, variations and combinations of the exemplary embodiments set forth herein may fall within the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to a display apparatus capable of seamlessly displaying a plurality of projection images and, more particularly, to an in-vehicle display apparatus, components of which may move due to vibration.

What is claimed is:

1. A display apparatus comprising:
a screen having a reflective member formed in at least a portion thereof;
a first light source unit including a first light output module for outputting a first visible light and a first infrared light source for outputting a first infrared light;
a second light source unit including a second light output module for outputting a second visible light and a second infrared light source for outputting a second infrared light;
a first scanner configured to output a first projection image based on the first visible light and the first infrared light to a first area of the screen by first-direction scanning and second-direction scanning;
a second scanner configured to output a second projection image based on the second visible light and the second infrared light to a second area of the screen by first-direction scanning and second-direction scanning;
a first light detector configured to detect a first reflected infrared light from the reflective member of the first area of the screen, wherein the first reflected infrared light corresponds to the first infrared light;
a second light detector configured to detect a second reflected infrared light from the reflective member of the second area of the screen, wherein the second reflected infrared light corresponds to the second infrared light; and
a processor configured to determine whether the first projection image and the second projection image projected onto the screen overlap or are separated based on the first reflected light received from the first area and the second reflected light received from the second area and to control the first projection image and the second projection image to be adjacent to each other on the screen when the first projection image and the second projection image partially overlap or are separated.

2. The display apparatus according to claim 1, wherein the reflective member includes a plurality of pattern members formed in at least a portion of the screen for reflection or scattering of the first infrared light and the second infrared light.

3. The display apparatus according to claim 2, wherein sizes of or distances between at least some of the plurality of pattern members are different.

4. The display apparatus according to claim 1, wherein the reflective member includes a reflective coating member formed in at least a portion of the screen.

5. The display apparatus according to claim 1, wherein the processor changes a scanning angle of at least one of the first scanner and the second scanner in the first direction or the second direction or changes a scan area or an active area of the scan area, when the first projection image and the second projection image overlap or are separated.

6. The display apparatus according to claim 1, wherein the processor scales at least one of the first projection image and the second projection image when the first projection image and the second projection image overlap or are separated.

7. The display apparatus according to claim 1, wherein light is output to the first area during a first frame, and light is output to the second area during a second frame.

8. A display apparatus comprising:
a screen having a reflective member formed in at least a portion thereof;
a first light source unit including a first light output module for outputting a first visible light and a first infrared light source for outputting a first infrared light;
a second light source unit including a second light output module for outputting a second visible light and a second infrared light source for outputting a second infrared light;
a first scanner configured to output a first projection image based on the first visible light and the first infrared light to a first area of the screen by first-direction scanning and second-direction scanning;
a second scanner configured to output a second projection image based on the second visible light and the second infrared light to a second area of the screen by first-direction scanning and second-direction scanning;
a light detector configured to detect a first reflected infrared light and a first reflected infrared light received from the screen, wherein the first reflected infrared light corresponds to the first infrared, light, and the second reflected infrared light corresponds to the second infrared light; and
a processor configured to determine whether the first projection image and the second projection image projected onto the screen overlap or are separated based on the first reflected light and the second reflected light received after being reflected from the reflective member and to control the first projection image and the second projection image to be adjacent to each other on the screen when the first projection image and the second projection image partially overlap or are separated.

9. The display apparatus according to claim 8, wherein:
the reflective member includes a plurality of pattern members formed in at least a portion of the screen for reflection or scattering of the first infrared light and the second infrared light, and
sizes of or distances between at least some of the plurality of pattern members are different.

10. The display apparatus according to claim 8, wherein the reflective member includes a reflective coating member formed in at least a portion of the screen.

11. The display apparatus according to claim 8, wherein the processor changes a scanning angle of at least one of the first scanner and the second scanner in the first direction or the second direction or changes a scan area or an active area of the scan area, when the first projection image and the second projection image overlap or are separated.

12. The display apparatus according to claim 8, wherein the processor scales at least one of the first projection image and the second projection image when the first projection image and the second projection image overlap or are separated.

13. A display apparatus comprising:
a screen having a reflective member formed in at least a portion thereof;
a first light source unit including a first light output module for outputting a first visible light and a first infrared light source for outputting a first infrared light;
a second light source unit including a second light output module for outputting a second visible light and a second infrared light source for outputting a second infrared light;
a first scanner-configured to output a first projection image based on the first visible a first area of the screen by first-direction scanning and second-direction scanning;
a second scanner configured to output a second projection image based on the second visible light to a second area of the screen by first-direction scanning and second-direction scanning;
a third scanner configured to output a first infrared light to the first area of the screen and a second infrared light to the second area of the screen by first-direction scanning and second-direction scanning;
a light detector configured to detect a first reflected infrared light and a first reflected infrared light received from the screen, wherein the first reflected infrared light corresponds to the first infrared light, and the second reflected infrared light corresponds to the second infrared light; and
a processor configured to determine whether the first projection image and the second projection image projected onto the screen overlap or are separated based on the first reflected light and the second reflected light received after being reflected from reflective member and to control the first projection image and the second projection image to be adjacent to each other on the screen when the first projection image and the second projection image partially overlap or are separated.

* * * * *